Patented Apr. 11, 1950

2,503,253

UNITED STATES PATENT OFFICE 2,503,253

AZO CATALYSTS IN PREPARATION OF SULFONYL CHLORIDES

Maurice Leon Ernsberger and Paul Swithin Pinkney, Wilmington, Del., assignors to E. I. du Pont de Nemours & Company, Wilmington, Del., a corporation of Delaware No Drawing. Application August 12, 1947, Serial No. 768,272

5 Claims. (Cl. 260—543)

This invention relates to the preparation of aliphatic sulfonyl chlorides and more particularly to the preparation of aliphatic sulfonyl chlorides from saturated hydrocarbons.

The preparation of hydrocarbon sulfonyl chlorides and particularly aliphatic hydrocarbon sulfonyl chlorides from the hydrocarbon, sulfur dioxide, and chlorine is disclosed in U. S. Reissue Patent 20,968.

This invention has as an object the preparation of aliphatic sulfonyl chlorides from saturated aliphatic hydrocarbons by reaction with sulfur dioxide and chlorine in the presence of a new catalyst for said reaction and without the necessity of irradiation with actinic light. A further object is the provision of a new catalytic process. Other objects will appear hereinafter.

These objects are accomplished by the following invention wherein a saturated hydrocarbon aliphatic in character, i. e. aliphatic or cycloaliphatic and containing a trimethylene,

—CH$_2$CH$_2$CH$_2$— radical, is treated with the mixture of sulfur dioxide and chlorine in the presence of a catalytic amount of an azo compound wherein both valences of the acyclic azo, —N=N—, group are attached to different carbons at least one, and preferably both, of which are tertiary and further bonded to a negative radical, neutral with respect to acidity, through carbon of said radical, the three remaining valences of said carbon of said radical being satisfied by oxygen or nitrogen. These neutral negative radicals are the nitrile, —CN, carbonamide, —CONH$_2$, and carbalkoxy, —COOR, radicals R being an alkyl of one to six carbons. The preferred azo catalysts are symmetrical having both valences of the acyclic azo, —N=N—, group bonded to tertiary carbons. These are active at lower temperatures.

The following examples in which parts are by weight are illustrative of the invention.

Example I

Into a reaction vessel not transparent to light and fitted with an agitator and gas inlet and gas outlet tubes was placed 200 parts of a highly paraffinic hydrocarbon fraction boiling between 265° and 305° C. and free from unsaturated constituents and having a specific gravity of 0.801 at 15.5° C. To this oil was added 4 parts of alpha,alpha' - azobis(isobutyronitrile). The flask and contents were then heated to about 35° C. by means of a water bath. A gaseous mixture of sulfur dioxide and chlorine was then passed into the flask while agitating. During the course of 45 minutes 103 parts of sulfur dioxide and 81 parts of chlorine were passed in. The temperature of the reaction mass rose almost immediately to about 45° C. and remained there while the water bath was held at about 35° C. Gaseous hydrogen chloride was evolved during this time. The reaction mass gained 68 parts during this time. The resultant mass was hydrolyzed by dropping slowly with agitation into 152 parts of 30% sodium hydroxide solution at 80–85° C. The resultant hydrolysis mass was just alkaline to phenolphthalein indicator papers and weighed 410 parts. It was diluted with 820 parts of water and 64 parts of ethyl alcohol, warmed to 65° C. and placed in a separatory funnel. On standing, an oil layer separated to the top. The layers were separated and 1184 parts of an aqueous solution and 97 parts of unreacted oil were obtained. The aqueous solution showed by analysis 11.2% of sodium aliphatic sulfonate (molecular weight 358) which is a yield of 133 parts.

Example II

The process of Example I was repeated using 300 parts of the hydrocarbon fraction and 6 parts of alpha,alpha'-azobis(isobutyronitrile) with 138 parts of sulfur dioxide and 107 parts of chlorine. The reaction mass gained 105 parts in the course of 65 minutes. The temperature was held at 45–50° C. The reaction mass was worked up as before and yielded 1896 parts of aqueous layer and 135 parts of unreacted oil. The aqueous layer analyzed 11.8% sodium aliphatic sulfonate. The aqueous layer was a good wetting agent showing a wetting speed of 25 seconds at a concentration of 3.15 g. per liter when tested by the Draves-Clarkson skein-sinking method (Year Book American Association of Textile Chemists and Colorists, 1945, p. 222).

Example III

Into the same equipment as used in Example I was placed 300 parts of the hydrocarbon fraction used in Example I and 1.5 parts of alpha,-alpha' - azobis(alpha,gamma - dimethylvaleronitrile). The temperature of the reaction mass was held at 25° C. while 211 parts of sulfur dioxide and 122 parts of chlorine were passed in over a period of 94 minutes. The reaction mass gained 106 parts. The resulting mixture of aliphatic sulfonyl chlorides and unreacted hydrocarbon was hydrolyzed with 273 parts of 30% sodium hydroxide. On working up as before 173 parts of unreacted oil were recovered showing that about 127 parts had been converted to aliphatic sulfonyl chlorides and subsequently by hydrolysis to the aliphatic sodium sulfonates.

When a run was made under all the above conditions but excluding the azo-dinitrile catalyst, the gain in weight was essentially nil, no water-soluble products were recovered and essentially all of the oil was recovered.

In the process of this invention there may be employed as a catalyst for the reaction of any saturated hydrocarbon, aliphatic in character and containing a trimethylene, —$CH_2CH_2CH_2$—, radical with sulfur dioxide and chlorine any azo compound wherein both valences of the acyclic azo, —N=N—, group are attached to different carbons at least one, and preferably both, of which are tertiary and further bonded to a negative radical, neutral with respect to acidity, through carbon of said radical, the three remaining valences of said carbon of said radical being satisfied by oxygen or nitrogen. These neutral negative radicals are the nitrile, —CN, carbonamide, —$CONH_2$, and carbalkoxy,

—COOR radicals R being an alkyl of one to six carbons. The preferred azo catalysts are symmetrical having both valences of the acyclic azo, —N=N—, group bonded to tertiary carbons. These are active at lower temperatures. Further illustrative compounds include diethyl alpha,alpha'-azobis(isobutyrate), dimethyl alpha,alpha'-azobis(isobutyrate), alpha,alpha' - azobis(alpha - ethylbutyronitrile), alpha,alpha' - azobis(cyclohexanecarbonitrile), alpha,alpha'-azobis(alpha-methylbutyronitrile), alpha,alpha'-azobis(alpha-methylenanthonitrile), diethyl alpha,alpha' - azobis(alpha,gamma-dimethylvalerate), dihexyl alpha,-alpha'-azobis(isobutyrate), alpha,alpha'-azobis(isobutyramide), alpha,alpha' - azobis(alpha,gamma-dimethylvaleramide), alpha,alpha'-azobis(alpha-cyclopropylpropionitrile). Various of these catalysts are effective at concentrations of from 0.1% to 3% based on the hydrocarbon.

The process of this invention is preferably carried out so that a substantial portion of the hydrocarbon remains unreacted. This is easily done by limiting the amount of sulfur dioxide and chlorine used. The extent of the reaction may be judged by the weight gain of the reaction mass or by its specific gravity. When not more than about half of the hydrocarbon is reacted, the bulk of the sulfonated hydrocarbon is present as the mono-sulfonate which is generally more valuable than the disulfonate. As an increasing proportion of the hydrocarbon is reacted, an increasing amount of di- and polysulfonated material is formed at the expense of the mono-sulfonated product. In general, the conditions given in U. S. Patents 2,202,791 and 2,197,800 apply equally to this reaction, the sole difference being the substitution of the catalyst described for light. The reaction may be carried out at any temperature between the melting point of the hydrocarbon and the decomposition point of the resultant sulfonyl chlorides which may range from 80 to 120° C. depending on the hydrocarbon. Usually temperatures between about 0° and 75° C., are preferred. Operation at atmospheric pressure is preferred for convenience. Moderate increase in pressure increases the reaction rate but if this is too high the reaction is difficult to control. The azo catalyst used in preferably one with a suitable decomposition rate at the reaction temperature desired. Pressures of 0.5 to 3 atmospheres are satisfactory although the reactions may be carried out without this range. The ratio of $SO_2$ to $Cl_2$ may vary between 1:1 and 5:1, the preferred range being 1.25 to 1.5 mols $SO_2$ per mol of $Cl_2$.

This invention has a distinct value in the art in that it permits the sulfonylation of saturated hydrocarbons in the dark. Heretofore it has been necessary to provide special equipment which would permit irradiation of the reaction mass with actinic light. This consisted of special vessels built with transparent tubes inserted in the walls or covers or else glass or quartz vessels. In addition it was necessary to provide sources of actinic radiation such as quartz mercury vapor lamps, arc lamps, fluorescent mercury vapor lamps and the like. By using the present invention it is possible to carry out the sulfonylation in conventional standard equipment.

The sulfonated products are of use as surface active agents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the preparation of hydrocarbon sulfonyl chlorides by the reaction of a saturated hydrocarbon of the class consisting of aliphatic hydrocarbons and cycloaliphatic hydrocarbons with a mixture of sulfur dioxide and chlorine, the improvement wherein the reaction is conducted in the presence of a catalyst of the class consisting of azobis(cyanoalkanes) wherein the cyano group of the cyanoalkyl radical is attached to tertiary carbon which is attached to the azo nitrogen and azobis(cyanocycloalkanes) wherein the cyano group of the cyanocycloalkyl radical is attached to tertiary carbon which is attached to the azo nitrogen.

2. Process of claim 1 wherein the catalyst is an azobis(cyanocycloalkane).

3. In the preparation of hydrocarbon sulfonyl chlorides by the reaction of a saturated aliphatic hydrocarbon with a mixture of sulfur dioxide and chlorine, the improvement wherein the reaction is conducted in the presence of an azobis(cyanoalkane) wherein the cyano group of the cyanoalkyl radical is attached to tertiary carbon which is attached to azo nitrogen.

4. In the preparation of hydrocarbon sulfonyl chlorides by the reaction of a saturated aliphatic hydrocarbon with a mixture of sulfur dioxide and chlorine, the improvement wherein the reaction is conducted in the presence of alpha-alpha'-azo-diisobutyronitrile.

5. In the preparation of hydrocarbon sulfonyl chlorides by the reaction of a saturated aliphatic hydrocarbon with a mixture of sulfur dioxide and chlorine, the improvement wherein the reaction is conducted in the presence of alpha,alpha'-azobis(alpha,gamma-dimethylvaleronitrile).

MAURICE LEON ERNSBERGER.
PAUL SWITHIN PINKNEY.

REFERENCES CITED

The following references are of record in the file of this patent:

Annalen, vol. 290, pp. 1 to 43, 1896.